(12) United States Patent
Mooty et al.

(10) Patent No.: US 7,429,430 B2
(45) Date of Patent: Sep. 30, 2008

(54) CORDLESS POWER TOOL BATTERY RELEASE MECHANISM

(75) Inventors: Tom Mooty, Jackson, TN (US); Earl Clowers, Anderson, SC (US); Mark Etter, Jackson, TN (US); Daily Gist, Jackson, TN (US); Michael Lagaly, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 662 days.

(21) Appl. No.: 10/686,796

(22) Filed: Oct. 16, 2003

(65) Prior Publication Data

US 2004/0081883 A1 Apr. 29, 2004

Related U.S. Application Data

(63) Continuation of application No. 09/577,653, filed on May 24, 2000, now Pat. No. 6,656,626, which is a continuation-in-part of application No. 29/105,748, filed on Jun. 1, 1999, now Pat. No. Des. 435,414.

(51) Int. Cl.
*H01M 2/10* (2006.01)
(52) U.S. Cl. .............................. 429/100; 429/99; 30/500
(58) Field of Classification Search ....................... None
See application file for complete search history.

(56) References Cited

U.S. PATENT DOCUMENTS

| 1,036,063 A | 8/1912 | Bedell et al. |
| 1,152,247 A | 8/1915 | Walker |
| 2,104,772 A | 1/1938 | Saunders |
| 2,261,230 A | 11/1941 | Cox et al. |

(Continued)

FOREIGN PATENT DOCUMENTS

DE 31 15280 A1 4/1982

(Continued)

OTHER PUBLICATIONS

Japanese Abstact, 1484694, Portable Drills, Aug. 27, 1974, 1 page.

(Continued)

*Primary Examiner*—John S Maples
(74) *Attorney, Agent, or Firm*—Adan Ayala

(57) ABSTRACT

A battery release mechanism for releasably securing a battery to a power tool is disclosed. The battery release mechanism includes a battery receiving portion integral with a handle portion of the power tool and an attachment portion integral with the battery. The attachment portion is configured to engage the battery receiving portion. The battery release mechanism also includes a closure member that is operable with and transversely disposed within the battery receiving portion. The closure member is configured to secure the battery within the battery receiving portion when the closure member is in a "lock" position. The closure member has a first end and a second end opposite the first end. The first end is disposed through a side wall of the tool housing and defines a push button for selectively moving the closure member from the "lock" position to a "release" position. When the closure member is in the "release" position, the battery can be removed from the power tool. A method of releasably securing a battery to a power tool is also disclosed.

7 Claims, 9 Drawing Sheets

U.S. PATENT DOCUMENTS

| | | | |
|---|---|---|---|
| 2,460,149 A | 1/1949 | Schoensiegel |
| 3,079,510 A | 2/1963 | Hartwig |
| 3,120,845 A | 2/1964 | Horner |
| 3,186,878 A | 6/1965 | Filander |
| 3,494,799 A | 2/1970 | Pedone, Jr. |
| 3,734,207 A | 5/1973 | Fishbein |
| 3,757,194 A | 9/1973 | Weber et al. |
| 3,767,468 A | 10/1973 | Schusler |
| 3,883,789 A | 5/1975 | Achenbach et al. |
| 3,943,934 A | 3/1976 | Bent |
| 3,952,239 A | 4/1976 | Owings et al. |
| 3,973,179 A | 8/1976 | Weber et al. |
| 3,999,110 A | 12/1976 | Ramstrom et al. |
| 4,050,528 A | 9/1977 | Foltz et al. |
| 4,091,880 A | 5/1978 | Troutner et al. |
| 4,386,609 A | 6/1983 | Mongeon |
| 4,441,563 A | 4/1984 | Walton, III |
| 4,447,749 A | 5/1984 | Reeb, Jr. et al. |
| 4,517,263 A | 5/1985 | Reiss et al. |
| 4,522,898 A | 6/1985 | Esrom |
| 4,555,849 A | 12/1985 | Ando et al. |
| 4,576,880 A | 3/1986 | Verdier et al. |
| 4,616,169 A | 10/1986 | Proffitt |
| 4,616,171 A | 10/1986 | Hernandez et al. |
| 4,716,352 A | 12/1987 | Hurn et al. |
| 4,728,876 A | 3/1988 | Mongeon et al. |
| 4,736,742 A | 4/1988 | Alexson et al. |
| 4,749,049 A | 6/1988 | Greppmair |
| 4,751,452 A | 6/1988 | Kilmer et al. |
| D300,132 S | 3/1989 | Culbertson et al. |
| 4,834,092 A | 5/1989 | Alexson et al. |
| 4,835,410 A | 5/1989 | Bhagwat et al. |
| 4,847,513 A | 7/1989 | Katz et al. |
| D304,026 S | 10/1989 | Goodner et al. |
| 4,871,629 A | 10/1989 | Bunyea |
| 4,873,461 A | 10/1989 | Brennan et al. |
| 4,904,549 A | 2/1990 | Goodwin et al. |
| 4,930,583 A | 6/1990 | Fushiya et al. |
| D310,813 S | 9/1990 | Culbertson et al. |
| 4,957,831 A | 9/1990 | Meredith et al. |
| 5,026,384 A | 6/1991 | Farr et al. |
| D320,917 S | 10/1991 | Fushiya et al. |
| D320,974 S | 10/1991 | Culbertson |
| 5,054,563 A | 10/1991 | Zapf |
| D323,276 S | 1/1992 | Fushiya et al. |
| 5,080,983 A | 1/1992 | Alexon et al. |
| 5,089,738 A | 2/1992 | Bergqvist et al. |
| 5,095,259 A | 3/1992 | Bailey et al. |
| 5,122,427 A | 6/1992 | Flowers et al. |
| 5,136,469 A | 8/1992 | Carusillo et al. |
| 5,140,249 A | 8/1992 | Linder et al. |
| 5,144,217 A | 9/1992 | Gardner et al. |
| 5,148,094 A | 9/1992 | Parks et al. |
| 5,149,230 A | 9/1992 | Nett |
| 5,169,225 A | 12/1992 | Palm |
| 5,200,280 A | 4/1993 | Karasa |
| 5,207,697 A | 5/1993 | Carusillo et al. |
| 5,208,525 A | 5/1993 | Lopic et al. |
| 5,213,913 A | 5/1993 | Anthony, III |
| 5,221,210 A | 6/1993 | Bormuth et al. |
| 5,229,702 A | 7/1993 | Boehling et al. |
| 5,230,261 A | 7/1993 | Akazawa et al. |
| 5,235,261 A | 8/1993 | Philipp |
| 5,244,755 A | 9/1993 | Benoist et al. |
| 5,263,972 A | 11/1993 | Evans et al. |
| 5,265,343 A | 11/1993 | Pascaloff |
| 5,306,285 A | 4/1994 | Miller et al. |
| 5,336,953 A | 8/1994 | Allemann |
| 5,354,215 A | 10/1994 | Viracola |
| 5,360,073 A | 11/1994 | Akazawa |
| 5,388,749 A | 2/1995 | Davignon et al. |
| 5,401,592 A | 3/1995 | Gilpin et al. |
| 5,406,187 A | 4/1995 | Harrison |
| 5,447,807 A | 9/1995 | Peled et al. |
| 5,456,994 A | 10/1995 | Mita |
| 5,460,906 A | 10/1995 | Leon et al. |
| D364,463 S | 11/1995 | Pitzen et al. |
| 5,480,734 A | 1/1996 | Schulz et al. |
| 5,489,484 A | 2/1996 | Wheeler et al. |
| 5,504,412 A | 4/1996 | Chan et al. |
| 5,508,123 A | 4/1996 | Fan |
| 5,551,883 A | 9/1996 | Davis |
| 5,553,675 A | 9/1996 | Pitzen et al. |
| 5,589,288 A | 12/1996 | Coulson et al. |
| D377,442 S | 1/1997 | Kikuchi |
| 5,597,275 A | 1/1997 | Hogan |
| D378,268 S | 3/1997 | Schultz |
| 5,620,808 A | 4/1997 | Wheeler et al. |
| 5,626,979 A | 5/1997 | Mitsui et al. |
| 5,629,602 A | 5/1997 | Makino |
| D379,795 S | 6/1997 | Pitzen et al. |
| 5,663,011 A | 9/1997 | Bunyea et al. |
| 5,671,815 A | 9/1997 | Kabatnik et al. |
| 5,681,667 A | 10/1997 | Bunyea et al. |
| 5,715,156 A | 2/1998 | Yilmaz et al. |
| 5,718,985 A | 2/1998 | Bunyea et al. |
| 5,738,954 A | 4/1998 | Latella et al. |
| 5,762,512 A | 6/1998 | Trant et al. |
| 5,766,794 A | 6/1998 | Brunette et al. |
| 5,787,361 A | 7/1998 | Chen |
| 5,789,101 A | 8/1998 | Wheeler et al. |
| 5,792,573 A | 8/1998 | Pitzen et al. |
| 5,799,739 A | 9/1998 | Takaada et al. |
| 5,800,940 A | 9/1998 | Bunyea et al. |
| D400,074 S | 10/1998 | Cooper |
| 5,816,121 A | 10/1998 | Yoshimizu et al. |
| D402,871 S | 12/1998 | Clowers et al. |
| D402,872 S | 12/1998 | Clowers et al. |
| 5,843,595 A | 12/1998 | Kawakatsu |
| 5,856,038 A | 1/1999 | Mason |
| 5,866,276 A | 2/1999 | Ogami et al. |
| D409,467 S | 5/1999 | Chung |
| 5,918,685 A | 7/1999 | Ulbrich et al. |
| 5,919,585 A | 7/1999 | Wheeler et al. |
| RE37,226 E | 6/2001 | Wheeler et al. |

FOREIGN PATENT DOCUMENTS

| | | | |
|---|---|---|---|
| DE | 33 17 398 A1 | | 10/1985 |
| DE | 36 36 968 A1 | | 5/1988 |
| DE | 37 42 240 A1 | | 6/1989 |
| DE | 40 41 247 A1 | | 7/1991 |
| DE | 40 29 018 A1 | | 3/1992 |
| DE | 9319361 | * | 3/1994 |
| DE | 195 27 201 A1 | | 1/1997 |
| DE | 28 36 263 A1 | | 3/1997 |
| EP | 0 272 434 A2 | | 6/1988 |
| EP | 0 698 449 A2 | | 7/1995 |
| EP | 0 920 105 A2 | | 11/1998 |
| JP | 57-156635 | | 9/1982 |
| JP | 5-326024 | | 12/1993 |
| JP | 6-150978 | | 5/1994 |
| JP | 10-3950 | | 1/1998 |
| WO | 9605623 | | 2/1996 |

OTHER PUBLICATIONS

Product brochure entitled "Maxion™ Cordless Powered Instrument System Assembly, Operation and Maintenance," by 3M HealthCare, 31 pages, no date.

Product brochure entitled "The K-100 Mini-Driver System, Cleaning and Lubrication," by 3M Surgical Products Division, 5 pages, no date.

Product brochure entitled "Cordless 800 Wire Driver," by Dyonics, 1984, 2 pages, no month.

Product brochure entitled "Cordless 450 Orthopaedic Drill," by Dyonics, 1984, 2 pages, no month.
Product brochure entitled "Mini-Driver™ Air Instrument System," by 3M, 1975, 4 pages, no month.
Product brochure entitled "Acculan," by Aesculap®, 4 pages, no date.
Product brochure entitled "Cordless Sagittal Saw," by Dyonics, 1984, 2 pages, no month.
Product brochure entitled "The Only Cordless Instrument Powerful Enough to be Stryker," by Stryker®, 1993, 4 pages, no month.
Product brochure entitled "System 2000 Heavy Duty Battery Powered Instruments," by Stryker®, 11 pages, no date.
Instruction manual entitled "The Hall® Orthair™ System," by Zimmer USA, 12 pages, no date.
Product brochure entitled "Hall® Versipower™ Dual Power Orthopaedic Instruments," by Zimmer, 1989, 6 pages, no month.
Product insert entitled "Mark III Electric Tool," by Avery Dennison, 1 page, no date.
Operating instructions entitled "Mark III Electric Tool," by Avery Dennison, 12 pages, no date.
Product brochure entitled "The Air Driver II from 3M," by 3M, 2 pages, no date.
Product brochure entitled "Powered Instrumentation for Large Bone Surgery," by Stryker®, 16 pages, no date.
Product brochure entitled "Sagittal Saw Attachment," by 3M, 2 pages, no date.
Product brochure entitled "Cordless 200 Reamer," by Dyonics, 1984, 2 pages, no month.
Product brochure entitled "System II OrthoPower 90 Battery Powered Surgical Instruments," by Stryker®, 1986, 16 pages, no month.
Maintenance manual and operating instructions entitled "System 2000 Battery Powered Instruments," by Stryker®, 1993, 18 pages, no month.
Bosch Catalog, front and back covers, and pp. 25-27 (1997), (no month).
Craftsman® Power and Hand Tools Catalog (1997-1998), cover page and p. 110, (no month).
DeWalt® 1997 Catalog, cover page and pp. 14, 15, 18, 21 and 22, (no month).
Milwaukee® Heavy-Duty Electric Tools for Contractors and Industry, Catalog 1997, cover pages and pp. 21-23 and 26-29, (no month).
Porter Cable Catalog, front and back covers, and pp. 46 and 47 (Jul. 1997).
Tools on Sale™ 1997 Catalog, cover page and pp. 8-15 and 18-20, (no month).

* cited by examiner

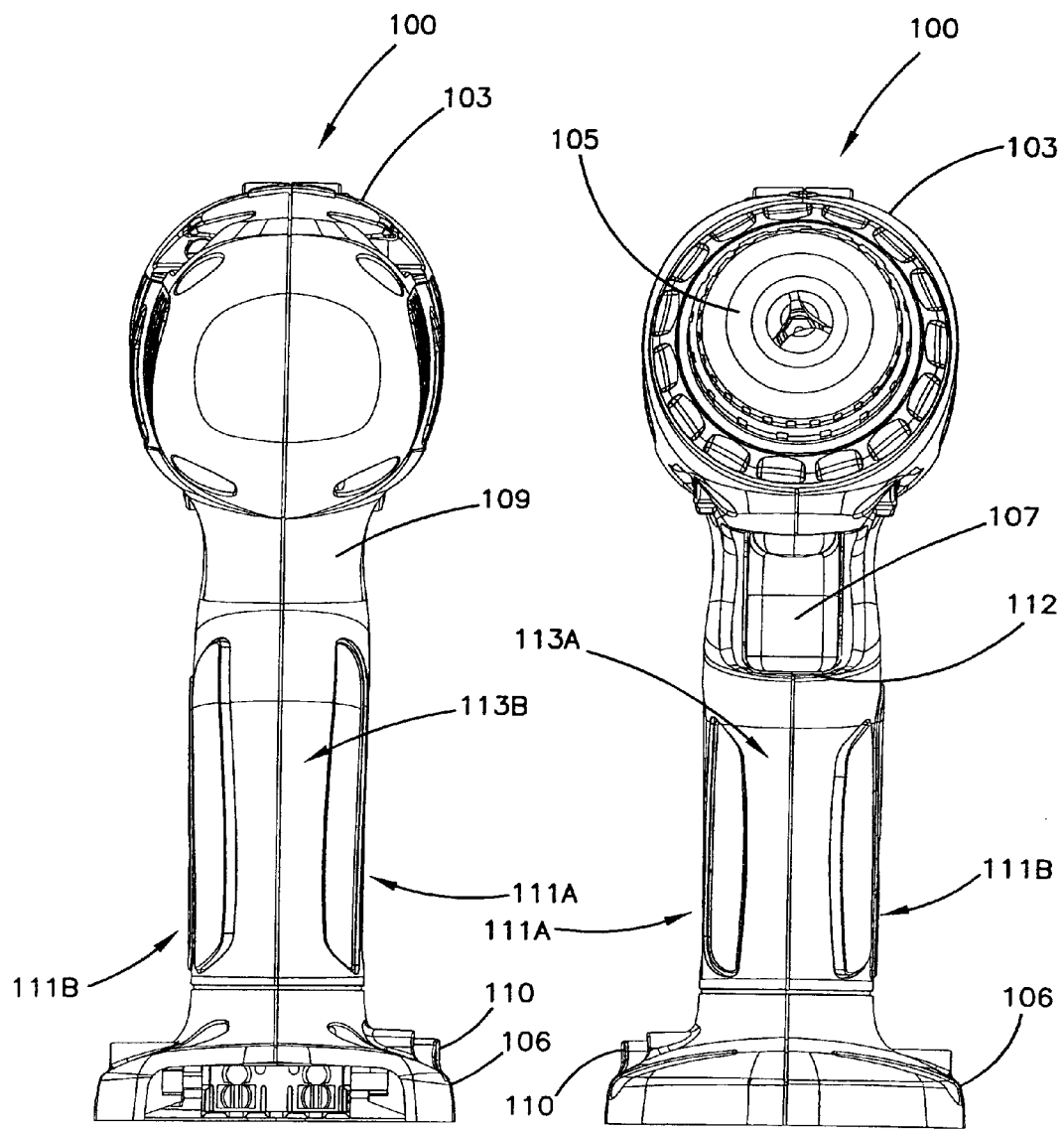

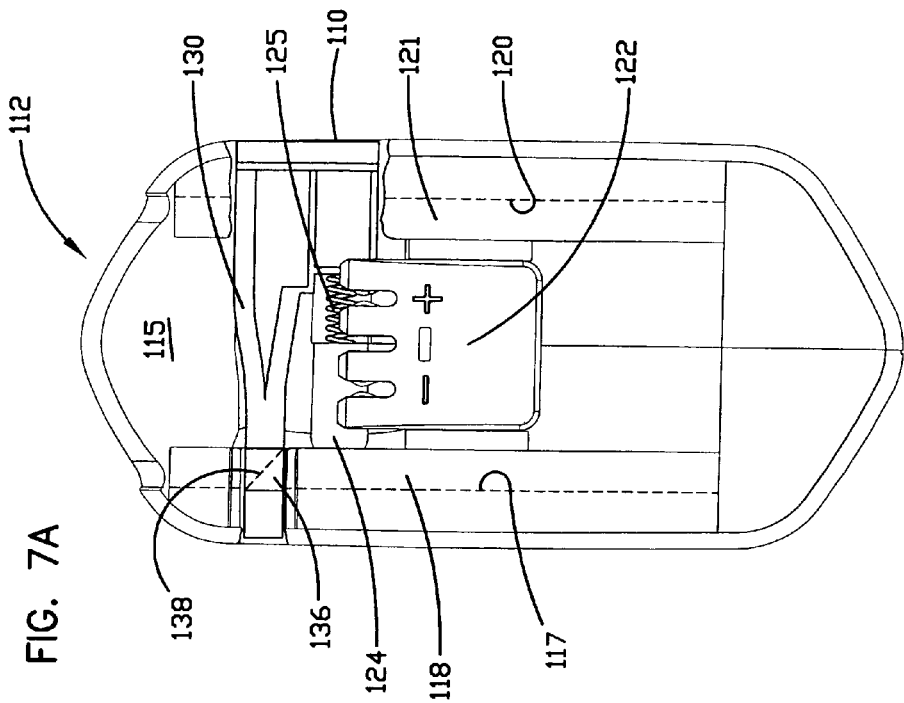
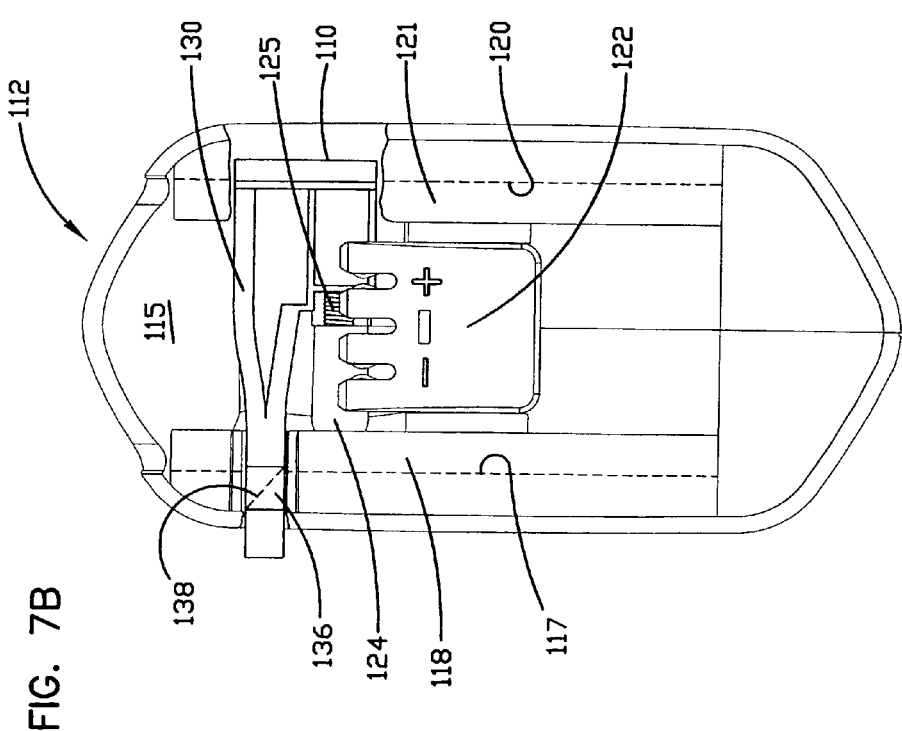

CORDLESS POWER TOOL BATTERY RELEASE MECHANISM

CLAIM FOR PRIORITY UNDER 35 U.S.C. § 120

This application is a Continuation of and claims priority under 35 U.S.C. §120 to U.S. patent application No. 09/577,653, now U.S. Pat. No. 6,656,626, entitled: Cordless Power Tool Battery Release Mechanism, filed on May 24, 2000 which in turn claims priority as a continuation-in-part under 35 U.S.C. §120 to U.S. patent application No. 29/105,748, filed on Jun. 1. 1999, now U.S. Pat. No. D,435,414, entitled: Battery Powered Drill/Driver, both of which are hereby incorporated by reference in their entirety.

TECHNICAL FIELD

The present invention relates to cordless power tools, and more particularly, to cordless power tools having a battery release mechanism for releasably securing a battery to the power tool.

BACKGROUND

Cordless power tools are well-known and provide several advantages over traditional corded power tools. One of the advantages provided by cordless power tools is the mobility and/or portability when using the tool. For example, the operator of the cordless power tool can quickly and efficiently work over a larger area without having to continually adjust the power cord. Similarly, cordless power tools can used in areas where electrical power is not available. Because of these advantages, the popularity of cordless power tools has increased among both professional and novice power tool users.

Despite these advantages, there are disadvantages associated with cordless power tools. One of the disadvantages associated with cordless power tools is the power limitations of the battery pack. Typically, most battery packs for cordless power tools can be operated between about 4 to 8 hours depending on the size of the battery and the amount of usage. Once the electrical charge in the battery is depleted, the operator typically is required to remove the battery pack from the power tool and recharge the battery using a battery charger.

Many existing power tools include battery release mechanisms that allow the battery to be removed from the power tool and recharged. Existing battery release mechanisms include latching arrangements that releasably secure the battery pack to the power tool. For example, some existing release mechanisms include two push buttons disposed on the side of the battery housing. In these arrangements, the battery pack extends upwards into the handle of the power tool. Thus, in order to remove the battery pack from the power tool, the user depresses both buttons and pulls downward on the battery pack to disengage the battery pack from the power tool. Other battery release mechanisms have a button disposed through the rear of the power tool. The user can release the battery pack from the power tool by depressing or sliding the button such that the latching arrangement allows removal of the battery pack.

However, there are several shortcomings with existing battery release mechanisms. For example, release mechanisms that have two buttons typically require the operator to hold the power tool and depress both buttons while trying to remove the battery pack from the power tool. Without depressing both release buttons, the battery pack is unable to be removed from the power tool. Moreover, release mechanisms having the release button disposed through the rear of the power tool typically require the operator to hold the tool differently from the way the power tool is held during operation in order to remove the battery. As a result, these battery release mechanisms are often cumbersome and difficult to use.

Improvements in the mechanisms used to releasably secure battery packs to cordless power tools are sought.

SUMMARY OF THE DISCLOSURE

The present disclosure generally relates to cordless power tools. More particularly, the present disclosure is directed towards cordless power tools having a battery release mechanism for releasably securing a battery to the power tool. The battery engages a closure member as the battery is forced into engagement with the tool from the rear.

One aspect of the invention relates to a cordless power tool having a main body portion, a handle portion depending from the main body portion and a mechanism for releasably securing a battery to the handle portion opposite the main body portion. The mechanism for releasably securing the battery to the handle portion includes a battery receiving portion integral with the handle portion and an attachment portion integral with the battery. The attachment portion is configured to engage the battery receiving portion. The mechanism also includes a closure member that is operable with and transversely disposed within the battery receiving portion. The closure member is configured to secure the battery within the battery receiving portion when the closure member is in a "lock" position. The closure member has a first end and a second end opposite the first end. The first end is disposed through a side wall of the tool housing and defines a push button for selectively moving the closure member from the "lock" position to a "release" position. When the closure member is in the "release" position, the battery can be removed from the power tool.

In yet another aspect of the invention, the closure member also includes a locking finger integral with the second end of the closure member. The locking finger is configured to secure the battery within the battery receiving portion when the closure member is in the "lock" position. Furthermore, the battery receiving portion includes a first guide channel and a second guide channel. Similarly, the attachment portion includes a first guide rail and a second guide rail. The first and second guide rails are configured to interlock with the first and second guide channels.

In an alternative aspect of the invention, the mechanism for releasably securing a battery to a power tool includes a battery receiving portion integral with the power tool housing. The battery receiving portion includes a mounting surface for receiving the battery and an attachment portion integral with the battery. The attachment portion is configured to slidably engage the battery receiving portion. Furthermore, the mechanism for releasably securing the battery to the power tool also includes a closure member that is operable with and arranged substantially perpendicular to the battery receiving portion. The closure member is configured to secure the battery within the battery receiving portion when the closure member is in a "lock" position. Conversely, the closure member is configured to disengage the battery when the closure member is in a "release" position. In this aspect of the disclosure, the closure member includes a first end and a second end opposite the first end. The closure member has an elongated body portion and a locking finger that is integral with and extends from the body portion substantially near the second end of the closure member. The locking finger is configured to secure the attachment portion to the power tool when the battery is positioned within the battery receiving portion.

In another aspect, the first end of the locking finger is disposed through a side wall of the tool housing and defines a push button for selectively moving the closure member from the "lock" position to the "release" position. The battery receiving portion includes a first guide channel and a second guide channel. Similarly, the attachment portion includes a first guide rail and a second guide rail. The first and second guide rails are configured to interlock with the first and second guide channels. The first guide rail has a first end for engaging the locking finger when the battery is moved in a first direction relative to the attachment portion. The first guide rail has a second end for engaging the locking finger when the battery is moved in a second direction relative to the attachment portion.

A method for releasably securing a battery to a power tool housing is also disclose. The method includes the steps of providing a power tool having a battery receiving portion integral with the power tool housing. The battery receiving portion is operable with a closure member that is transversely disposed within the battery receiving portion and configured to secure the battery within the battery receiving portion. The closure member has a first end and a second end. The first end of the closure member is disposed through a side wall of the tool housing and defines a push button for selectively moving the closure member from a "lock" position to a "release" position. On the battery, an attachment portion is provided that is integral with the battery and is further constructed to engage the battery receiving portion. The method further includes the steps of aligning the attachment portion with the battery receiving portion and moving the battery in a first direction such that the attachment portion slidably engages the battery receiving portion and the closure member such that the closure member is urged into the "release" position. To releasably secure the battery to power tool, the battery is positioned within the battery receiving such that the closure member returns to the "lock" position. Preferably, the attachment portion slidably engages the battery receiving portion from the rear of the power tool.

The above summary of the present invention is not intended to describe each illustrated embodiment or every implementation of the present invention. Other objects, features and advantages of the present invention will become more apparent in light of the following detailed description of exemplary embodiments thereof, as illustrated in the accompanying drawings.

BRIEF DESCIPTION OF THE DRAWINGS

The invention may be more completely understood in consideration of the following detailed description of various embodiments of the invention in connection with the accompanying drawings, in which:

FIG. 4 is a side-elevational view illustrating the front of the power tool shown in FIGS. 1-3;

FIG. 5 is a side-elevational view illustrating the rear of the power tool shown in FIGS. 1-4;

FIG. 7A is a plan view of the bottom of the power tool shown in FIGS. 1-5 illustrating a battery release mechanism in a "lock" position;

FIG. 7B is a plan view of the bottom of the power tool shown in FIG. 1 illustrating the battery release mechanism in a "release" position;

Figure 1:
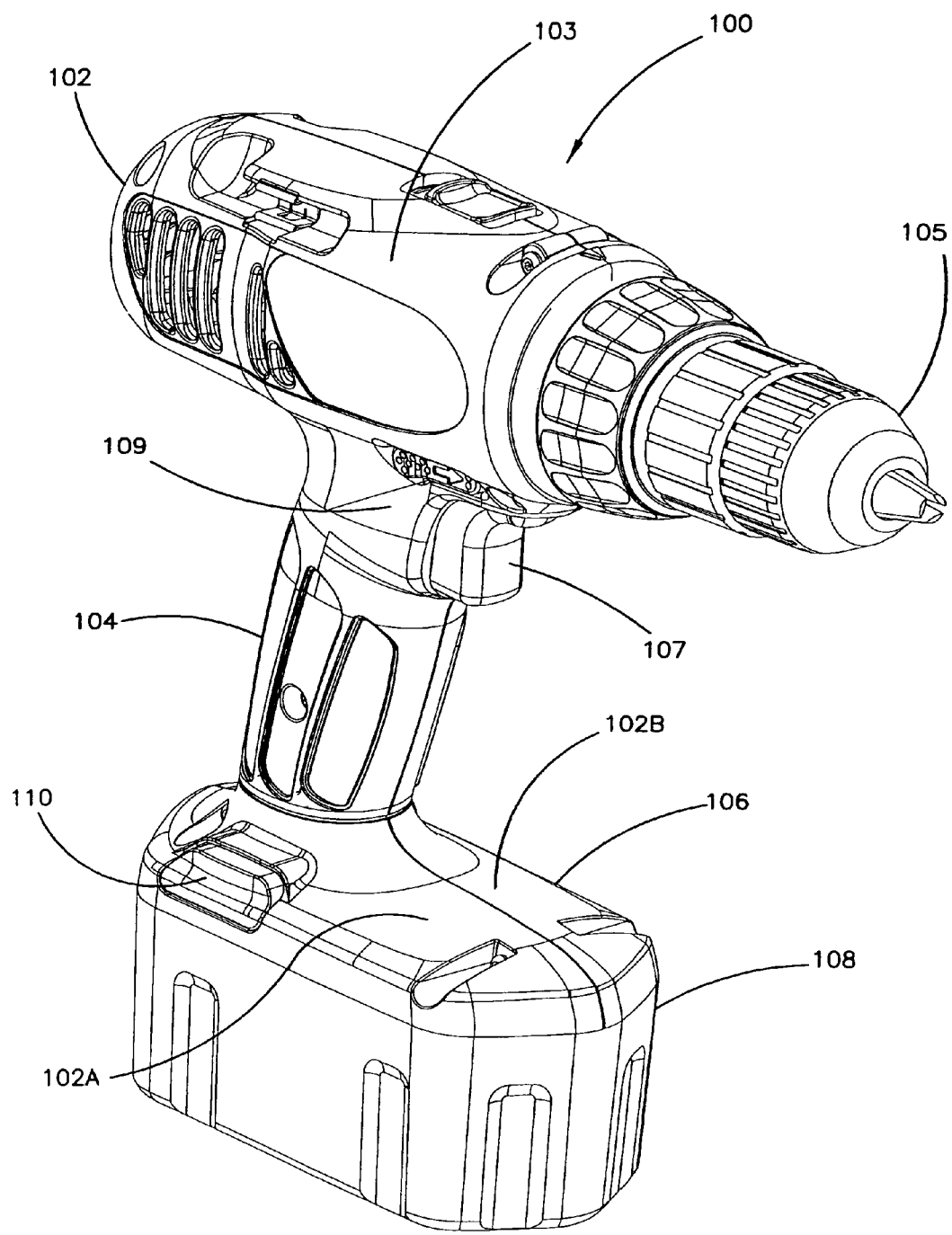
FIG. 1 is a perspective view illustrating a power tool having a battery pack secured thereto according to the principles of the present disclosure.
Figure 3:
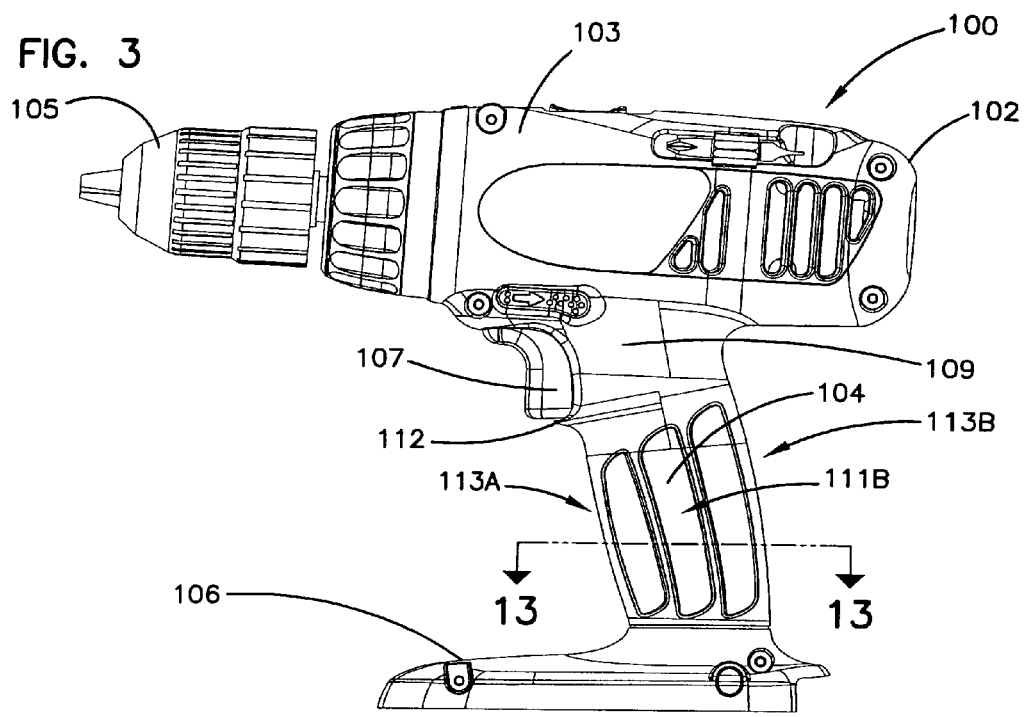
FIG. 3 is a side-elevational view illustrating a second side of the power tool shown in FIG. 1 opposite the first side of the power tool shown in FIG. 2.
Figure 2:
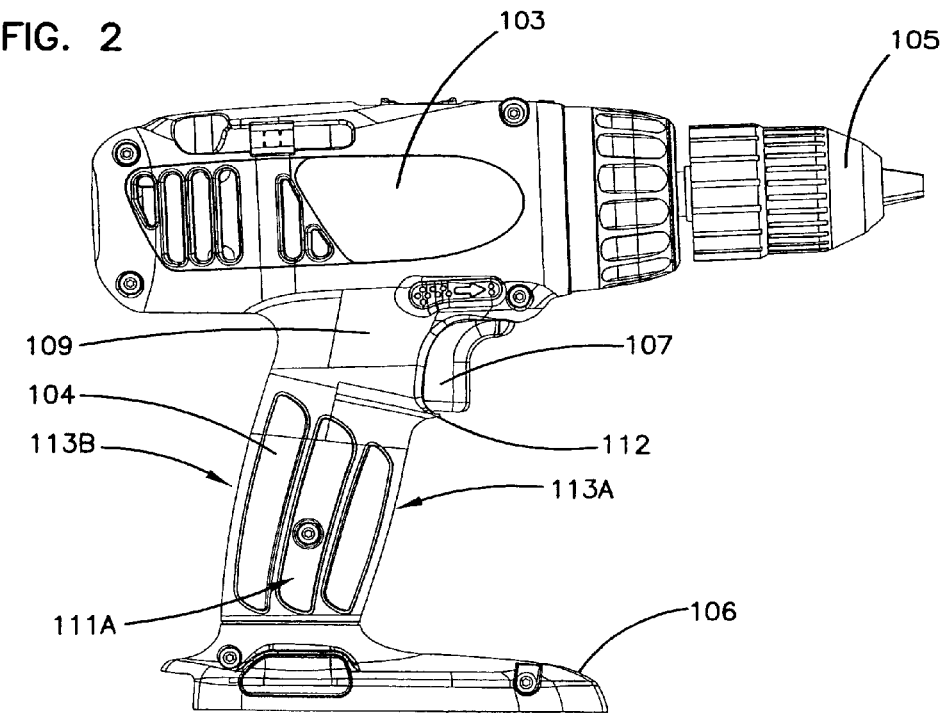
FIG. 2 is a side-elevational view illustrating a first side of the power tool shown in FIG. 1.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present disclosure generally relates to cordless power tools. More particularly, the present disclosure is directed towards cordless power tools having a battery release mechanism for releasably securing a battery to the power tool. While the present invention is not so limited, a more detailed understanding of the present invention will be gained through a discussion of the drawings in connection with the examples provided below.

Referring now to FIG. 1, there is illustrated a cordless electric power tool 100. By way of illustration, the power tool 100 shown in FIG. 1 is an electric power drill/driver. However, it should be understood that the present invention is generally applicable to a variety of power tools, including cordless circular saws, cordless reciprocating saws, planars, flashlights, as well as other cordless tools having a rechargeable battery pack secured thereto.

The power tool 100 has a housing 102 that is preferably molded from a suitable plastic material, such as polyethylene, polypropylene, or polyurethane. In a preferred embodiment, the power tool housing 102 is injection molded having two halves portions 102A, 102B. The two halve portions 102A, 102B are secured together in a conventional manner using mechanical fasteners (not shown), such as screws. The tool housing 102 includes a generally tubular and elongated main body portion 103. An electric motor (not shown) is disposed within the body portion 103. The electric motor is electrically coupled to a battery pack 108 that provides the electrical energy to power the electric motor. Furthermore, the electric motor is mechanically coupled to an output shaft 105 that can be configured to operate with various tool accessories. For example, the output shaft 105 is a conventional drill chuck that can be configured to operate with tool accessories, such as, drill bits, drivers, or other accessories.

The tool housing 102 also includes a handle portion 104 that extends downwardly from the main body portion 103. By "downwardly," it is meant that in the orientation of the power tool 100 shown in FIG. 1, the handle portion 104 extends below the main body portion 103 of the power tool 100. The handle portion 104 is configured and arranged to allow a user to easily grip and maneuver the power tool 100 during operation. As shown in FIGS. 2-5, the handle portion 104 includes a first side region 111A, a second side region 111B opposite the first side region 111A. Additionally, the handle portion 104 includes a front region 113A connecting the first and second side regions 111A, 111B along the front of the power tool, and a rear region 113B connecting the first and second side regions 111A, 111B along the rear of the power tool 100. In the embodiment shown in FIGS. 2-5, the first side region 111A is the "right-hand" side of the handle portion 104 and the second side region 111B is the "left-hand" side of the handle portion 104.

The power tool housing 102 also defines a trigger receiving portion 109 disposed between the main body portion 103 and the handle portion 104. More particularly, the trigger receiving portion 109 is disposed between the main body portion 103 and the front region 113A. The trigger receiving portion 109 is sized and configured to allow the operator to engage a trigger 107 disposed through the trigger receiving portion 109. Moreover, the trigger receiving portion 109 defines a ridge 112 that separates the trigger receiving portion 109 from the handle portion 104. The ridge 112 assists the operator in properly aligning his hand on the handle portion 104 when operating the power tool 100. For example, when the operator is gripping the power tool 100, the operator typically uses his trigger finger (eg. the operator's forefinger) to actuate the trigger 107. While the operator's trigger finger is positioned over the trigger receiving portion 109, the ridge 112 ensures that the operator's other fingers are positioned below the trigger 107 and are, therefore, unable to actuate the trigger 107.

Referring again to FIG. 1, the power tool 100 also includes a support portion 106 that is integral with the handle portion 104. The support portion 106 is generally flat and elongated and extends in a direction substantially parallel to the elongated main body portion 103. The support portion 106 stabilizes the power tool 100 when resting on a flat surface in an upright position as shown in FIG. 1. As will be described in greater detail below, a battery pack 108 is releasably secured to the support portion 106 of the power tool 100. In one embodiment, the battery 108 can be released from the power tool 100 by depressing the button 110 which is disposed through a side of the handle portion 104.

Figure 6:
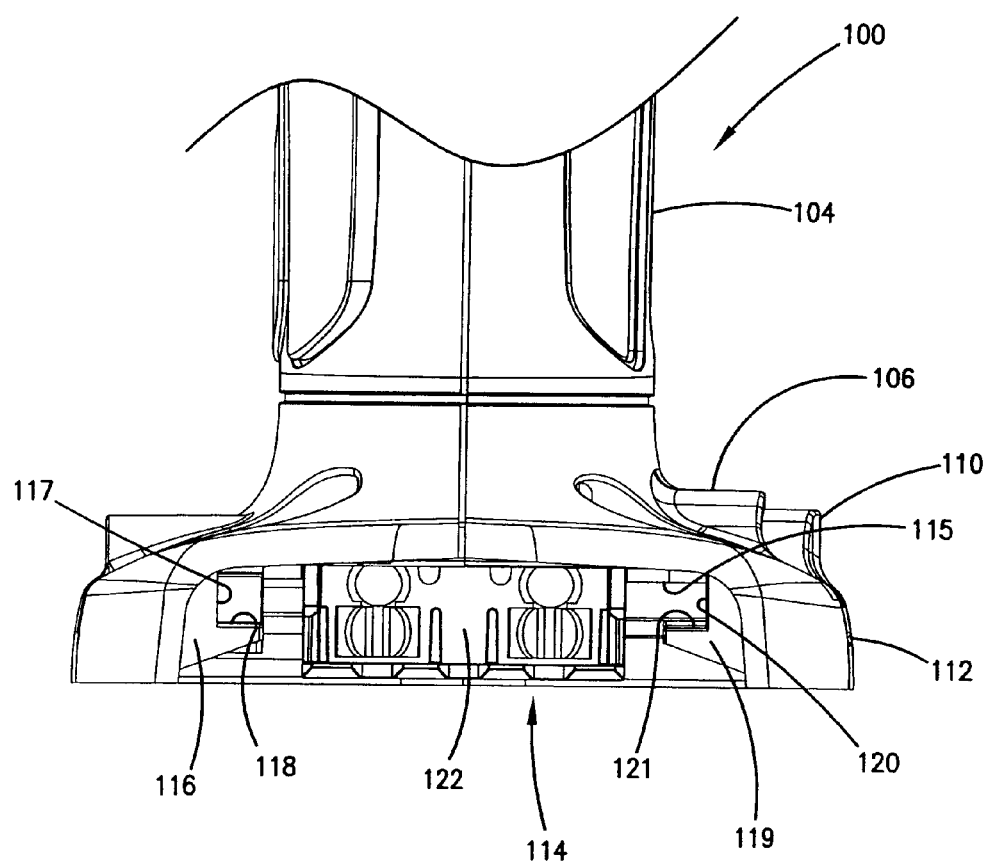
FIG. 6 is a side-elevational view illustrating the battery receiving portion from the rear of the power tool shown in FIG. 5.

Referring now to FIG. 6, a side elevational view illustrating the rear of the power tool 100 is shown. As can be seen, the support portion 106 depends from and is integral with the handle portion 104. The support portion 106 includes a battery receiving portion 112. The battery receiving portion 112 is sized and configured to slidably receive the battery 108 (FIG. 1) through the opening 114. The battery receiving portion 112 is capable of accommodating any size battery 108 that is capable of operating the cordless power tool 100. For example, the battery 108 can be a 12 volt, 14.4 volt or a 19.2 volt battery or any other size battery capable of operating the cordless power tool 100. The battery receiving portion 112 includes a first guide channel 116 and a second guide channel 119. The first guide channel 116 is generally "L-shaped" and includes an upright member 117 depending from the mounting surface 115. A flange member 118 extends laterally from and substantially perpendicular to the upright member 117. Similarly, the second guide member 119 is also generally "L-shaped" and includes an upright member 120 depending from and substantially perpendicular to the mounting surface 115. A flange member 121 extends laterally from and substantially perpendicular to the upright member 120. Additionally, electrical terminals or contacts 122 depend from the mounting surface 115 and are disposed within the battery receiving portion 112. Preferably, the electrical terminals or contacts 122 are substantially centered between the first and second guide channels 116, 119. The electrical terminals 122 are situated to engage the battery terminals 162 integral with the battery 108 discussed below in connection with FIGS. 10 and 11.

Referring now to FIG. 7A, a bottom plan view of the power tool 100 is shown illustrating the battery release mechanism according to the principles of the present disclosure. As can be seen, the first guide channel 116 is substantially parallel to the second guide channel 119. Further, the first and second guide channels 116, 119 are situated along the length of the mounting surface 115 and are spaced apart a lateral distance. As discussed above, the first and second guide channels 116, 119 are constructed and arranged to receive the battery 108 (FIG. 1).

Figure 8:
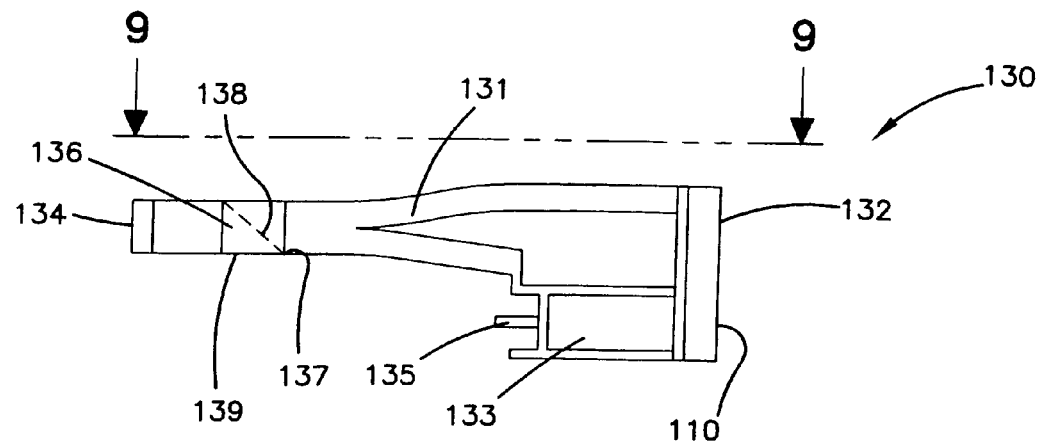
FIG. 8 is a plan view of a closure member for use with the battery release mechanism of the present disclosure.
Figure 9:
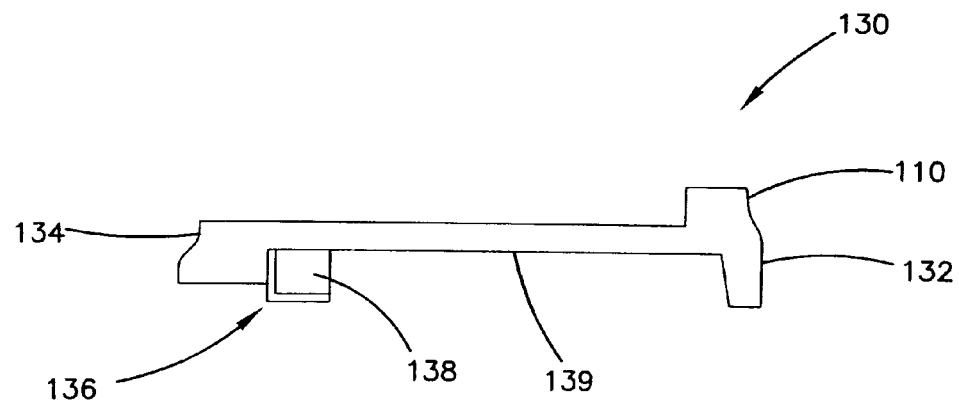
FIG. 9 is a side-elevational view of the closure member shown in FIG. 8.

The battery release mechanism includes a generally elongated closure member 130 that is situated within the battery receiving portion 112 substantially perpendicular to the first and second guide channels 116, 119. As shown in FIGS. 8 and 9, the closure member 130 has a first end 132 and a second end 134. The first end 132 is disposed through a side wall of the power tool housing 100 and defines a push button 110 that allows a user to selectively move the closure member 130 from a "lock" position to a "release" position. In one embodiment, the push button 110 is disposed through the first side region 111A of the handle portion 104. Alternatively, the push button 110 can be disposed through the second side region 111B of the handle portion 104. Thus, an operator can easily and efficiently release the battery 108 from the power tool 100 by depressing a single button 110 disposed through a side region of the power tool 100.

Additionally, as shown in FIG. 9, the elongated closure member 130 also includes a locking finger 136 at or substantially near the second end 134. The locking finger 136 is constructed and arranged to selectively obstruct the first guide channel 116. As shown in FIG. 8, the locking finger 136 includes an angled or chamfered surface 138 and a rear edge surface 139 that converge at the tip 137. In one embodiment, the locking finger 136 obstructs at least a portion of the first guide rail 116 when the closure member 130 is disposed within the battery receiving portion 112 and in the "lock" position. By "obstruct," it is meant that the tip 137 of the locking finger 136 extends beyond the upright member 117 of the first guide rail 116. In the embodiment shown in FIG. 6, the tip 137 of the locking finger 136 is substantially coplanar with the tip 118A of the laterally extending flange member 118. Conversely, when the closure member 130 is in the "release" position as shown in FIG. 7B, the locking finger 136 no longer obstructs the first guide channel 116. Instead, the tip 137 of the locking finger 136 is substantially coplanar with the upright member 117. In the embodiment shown in FIG. 7B, the tip 137 of the locking finger 136 is substantially coplanar with the upright member 117.

A post 135 extends from a lower portion 133 of the closure member 130 as shown in FIGS. 7A, 7B, and 8. The post 135 is sized and configured to receive a spring 125, such as a helical coil compression spring. The spring 125 biases the closure member 130 in the "lock" position. For example, when the closure member 130 is disposed within the battery receiving portion 112, the spring 125 biases the closure member 130 into the "lock" position such that the locking finger 136 obstructs at least a portion of the first guide channel 116 as discussed above. Conversely, when the push button 110 is depressed, the spring 125 is compressed as the closure member 130 is moved from the "lock" position to the "release" position.

Figure 10:
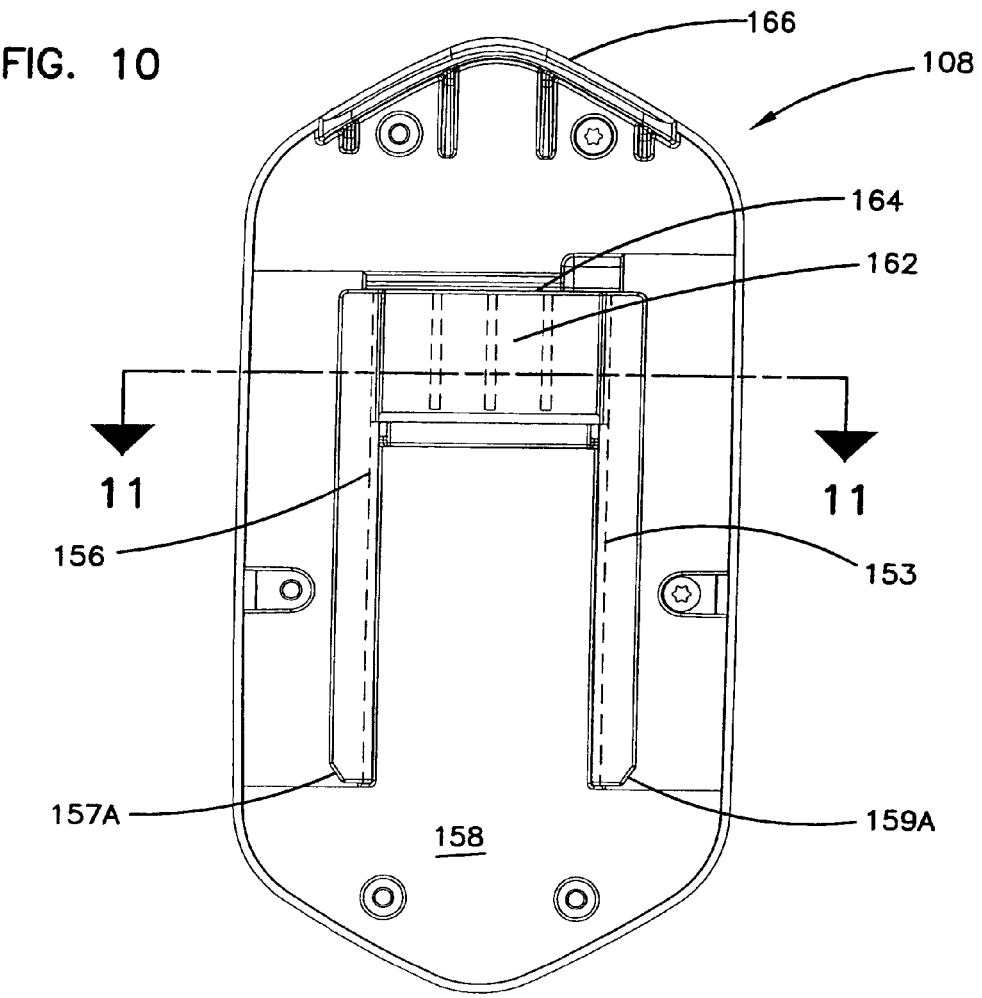
FIG. 10 is a plan view of the top of a battery pack illustrating the battering receiving portion according to the principles of the present disclosure.
Figure 11:
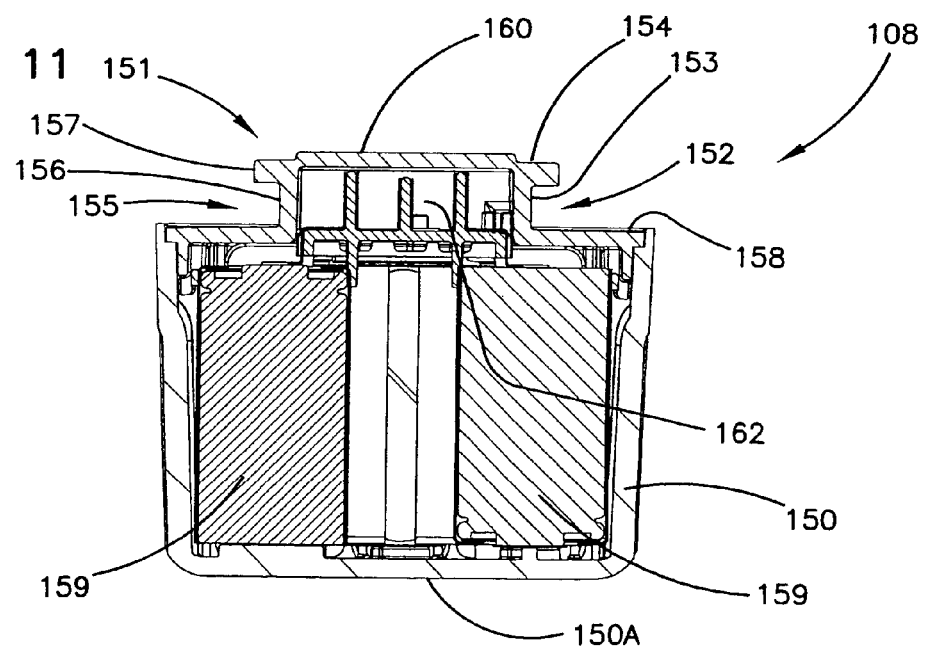
FIG. 11 is a side-elevational view of the battery pack shown in FIG. 10.

As discussed above, the battery receiving portion 112 is constructed and arranged to receive and secure the battery 108 within the battery receiving portion 112. Referring now to FIGS. 10 and 11, the battery 108 includes a main body portion 150. The main body portion 150 has a flat bottom surface 150A that allows the power tool 100 to remain in an upright position as shown in FIG. 1 when the battery 108 is secured to the power tool 100.

An attachment portion 151 opposite the bottom surface 150A is provided to engage with the battery receiving portion 112 of the power tool 100. In a preferred embodiment, the attachment portion 151 is substantially centered on the attachment surface 158. The attachment portion 151 includes a first guide rail 152 and a second guide rail 155. The first guide rail 152 is a generally "L-shaped" and includes an upright member 153 extending upwards and substantially perpendicular from the attachment surface 158 and opposite the bottom surface 150A. A flange member 154 extends laterally from and substantially perpendicular to the upright member 153. The second guide rail 155 is also generally "L-shaped" and also includes an upright member 156 extending upwards and substantially perpendicular from the attachment surface 158 and opposite the bottom surface 150A. A flange member 157 extends laterally from and substantially perpendicular to the upright member 156. A rear edge 164 extends between and connects the first and second guide rails 152, 155.

The first and second guide rails 152, 155 are constructed and arranged to engage and interlock with the first and second guide channels 116, 119, respectively. By "interlock," it is meant that the first and second guide rails 152, 155 cooperate with the first and second guide channels 116, 119 to allow the battery 108 to slidably engage with the power tool 100. To facilitate this, the flange member 154 of the first guide rail 152 has a chamfered or beveled leading edge 154A. Similarly, the flange member 157 of the second guide rail 155 has a chamfered or beveled leading edge 157A. The chamfered or beveled leading edges 154A, 157A allows easier alignment and interlocking between the first and second guide rails 152, 155 and the first and second guide channels 116, 119.

The battery terminals 162 are disposed within the attachment portion 151 of the battery 108. The battery terminals 162 are electrically coupled to the battery cells 159 disposed within the main body portion 150 of the battery 108. The battery terminals 162 are constructed and arranged to engage the battery contacts 122 disposed within the battery receiving portion 112. Accordingly, electrical communication is provided between the battery terminals 162 and the battery contacts 122 when the battery 108 is releasably secured to the power tool 100 according to the present disclosure. Furthermore, the battery 108 also includes a sealing member 166 that seals the opening 114 once the battery 108 is releasably secured to the power tool 100.

Figure 12:
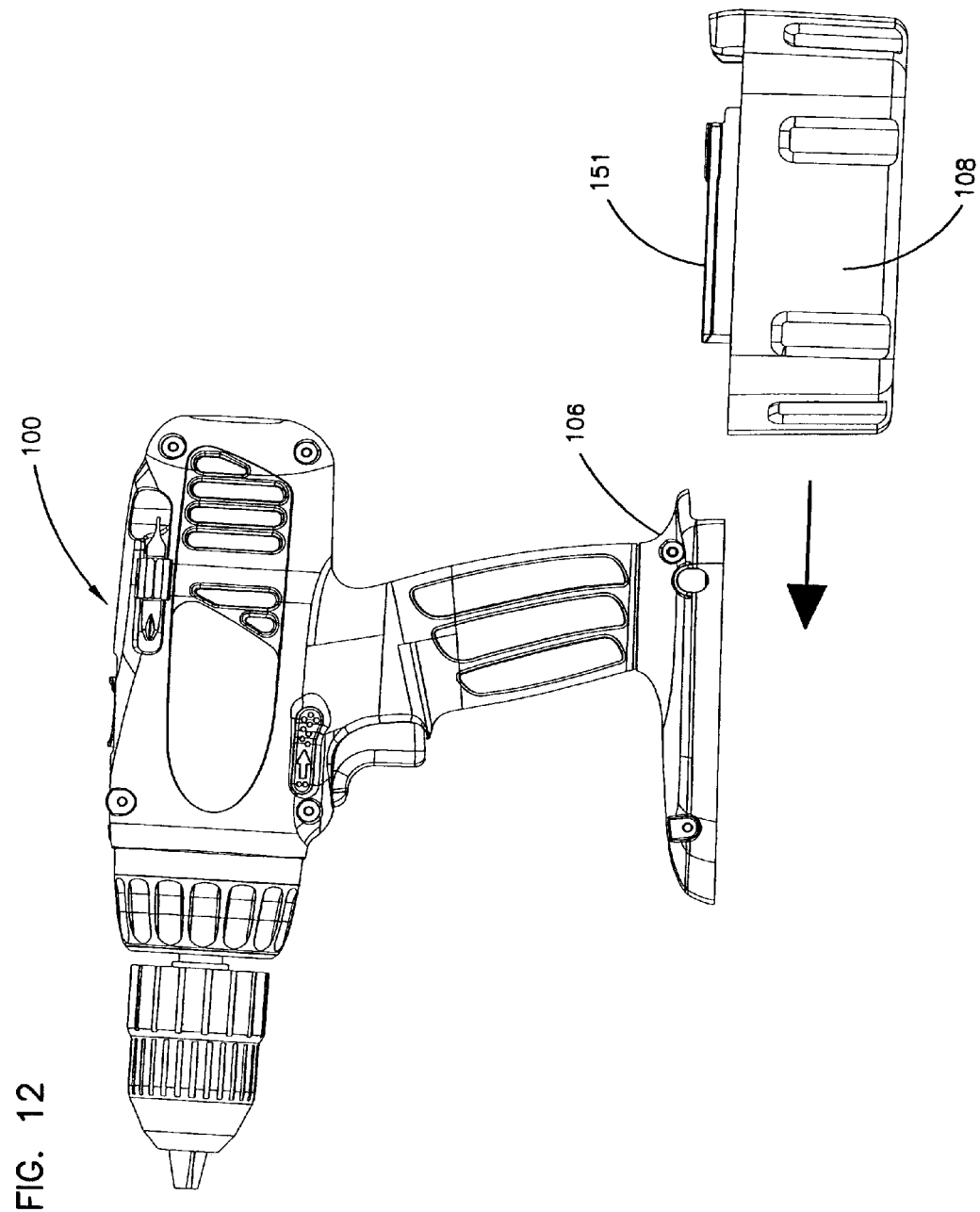
FIG. 12 is an exploded, side-elevational view of the power tool shown in FIGS. 1-5 illustrating a battery in slidable engagement with the power tool.
Figure 13A:
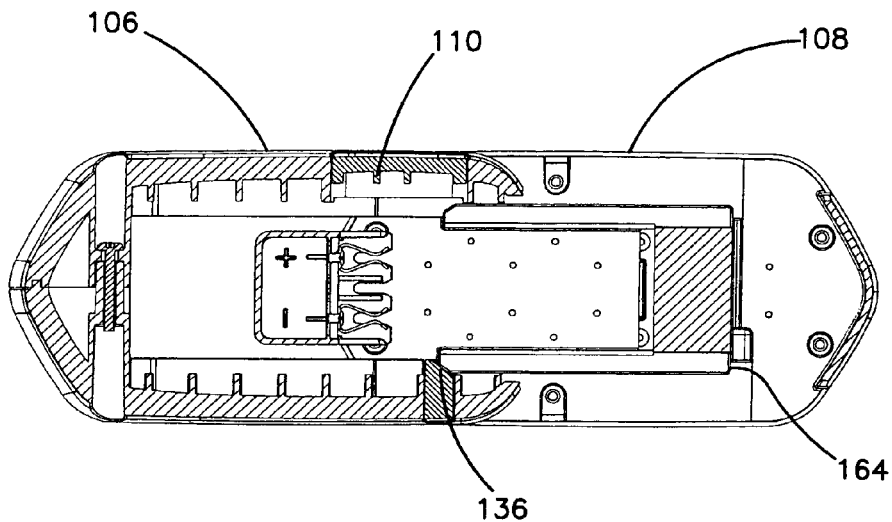
FIGS. 13A, 13B, and 13C are cross-sectional views of the power tool of FIG. 3 taken along line 13-13 illustrating engagement of the battery of FIGS. 10 and 11 with the power tool of FIGS. 1-5.

In operation, the battery 108 can be releasably secured to the power tool 100 by bringing the attachment portion 151 of the battery 108 into engagement with the battery receiving portion 112 of the power tool 100. Preferably, as shown in FIG. 12 the battery 108 is brought into engagement with the power tool 100 from the rear. This is accomplished by first aligning the attachment portion 151 with the opening 114 of the battery receiving portion 112. As shown in FIG. 13A, after aligning the attachment portion 151 with the battery receiving portion 112, the battery 108 can be slid into the tool housing 102 such that the first guide rail 152 engages the first guide channel 116 and the second guide rail 155 engages the second guide channel 119. For example, FIG. 13A shows the battery receiving portion 112 and the attachment portion 154A in initial engagement. Thus, the leading edge 154A is in physical engagement with the locking finger 136 that obstructs at least a portion of the first guide channel 116.

Figure 13B:
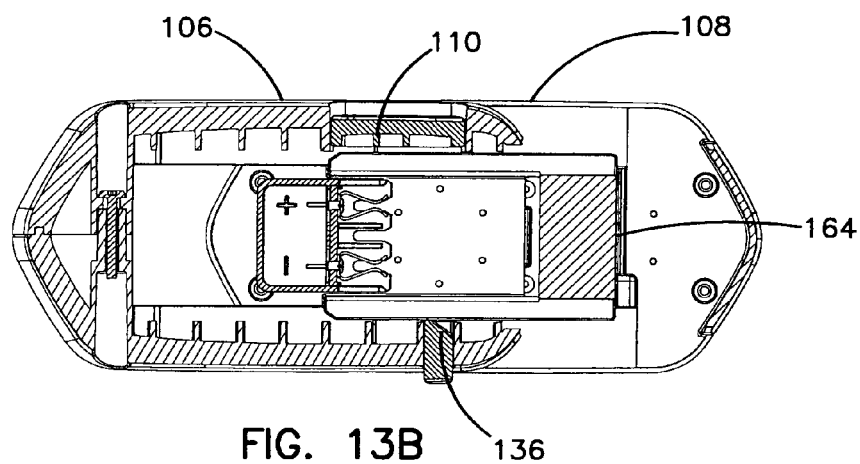
Figure 13C:
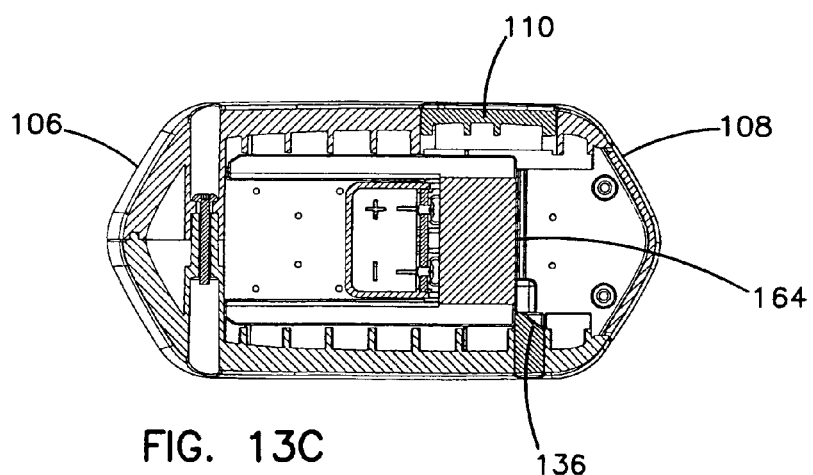

As the attachment portion 151 is slid into engagement with the battery receiving portion 112, the first and second guide rails 152, 155 are allowed to interlock with the first and second guide channels 116, 119. As discussed above, the closure member 130 is biased into the "lock" position such that the locking finger 136 obstructs at least a portion of the first guide channel 116. However, as shown in FIG. 13B, as the battery 108 is slidably moved into engagement with the battery receiving portion 112, the first guide rail 152 engages the closure member 130 and urges the closure member 130 into the "release" position. For example, the first guide rail 152 urges the locking finger 136 out of the first guide channel 116 such that the tip 137 is substantially coplanar with the upright member 117 of the first guide channel 116. In a preferred embodiment, the flange member 153 of the first guide rail 152 has a chamfered leading edge 153A that engages the angled or chamfered surface 138 of the locking finger 136 as the first guide rail 152 slidably engages the first guide channel 116. Accordingly, the resistance of the locking finger 136 to be moved from the guide channel 116 is reduced. The battery 108 is moved further into the battery receiving portion 112 until the rear edge 164 of the attachment portion 151 moves beyond the rear edge 139 of the locking finger 136 as shown in FIG. 13C. In this position, the first guide rail 152 no longer urges the locking finger out of the first guide channel 116 and therefore, the closure member 130 is allowed to return to the "lock" position. In this position, the battery 108 is secured to the power tool 100.

An operator can release the battery 108 from the power tool 100 by depressing the push button 110 and urging the battery 108 in a direction towards the rear of the power tool 100. Preferably, the push button 110 is disposed through the side of the power tool housing 102 and can be depressed by the operator using the same hand that urges the battery 108 away from the power tool 100. By depressing the push button 110, the closure member 130 is urged from the "lock" position to the "release" position. In the "release" position, the locking finger 136 of the closure member 130 no longer obstructs the first guide channel 116. Thus, the rear edge 164 of the attachment portion 151 no longer prevented from movement by the rear edge 139 of the locking finger 136. As a result, the battery 108 can be easily removed from the battery receiving portion 112 of the power tool 100 by depressing a single button 110 disposed through a side region of the power tool 100 and pulling the battery 108 from the power tool 100.

The operator can maintain a firm grip on the handle portion 104 with a first hand while gripping the battery 108 and depressing the push button 110 with a second hand. Preferably, the first hand of the operator grips the handle portion 104 of the power tool 100 similar to the way the power tool 100 is held during operation. A second hand of the operator grips the battery while depressing the button 110 and pulling the battery 108 from the power tool 100. Alternatively, the operator can depress the button 110 with a finger of the first hand holding the handle portion 104 while pulling the battery 108 from the power tool 100. In either case, the operator can easily and efficiently remove the battery 108 from the power tool 100.

The above specification and embodiments are believed to provide a complete description of the manufacturer and use of particular embodiments of the invention. Many embodiments of the invention can be made without departing from the spirit and scope of the invention, which is limited by the attached claims.

We claim:

1. A mechanism for securing a removable battery to a power tool, comprising:
    a battery receiving portion including at least one upright member and flange forming a guide channel for receiving a corresponding rail included on a removable battery; and
    a closure member slidingly mounted to the battery receiving portion said closure member being configured to move between a locked position and a released position, said closure member including a generally angled surface directed toward the battery during connection of the battery to the power tool, wherein the angled surface of the closure member, when in a locked position, is disposed within guide channel such that contact by the rail included on the battery automatically forces the closure member into a released position.

2. The mechanism of claim 1, further comprising means for biasing the closure member into the locked position.

3. The mechanism of claim 1, wherein the closure member is formed with a push-button directed towards the exterior of the power tool.

4. The mechanism of claim 3, wherein depressing the push-button inwards toward the battery receiving portion disposes the closure member in the released position.

5. The mechanism of claim 1, wherein the received battery rail includes a chamfered leading edge of an upright member forming the rail.

6. The mechanism of claim 1, wherein the battery receiving portion is configured to support the power tool when no battery is connected.

7. The mechanism of claim 1, wherein a movement of the closure member between the locked position and the released position is generally transverse to the at least one channel guide.

* * * * *